United States Patent Office 3,017,411
Patented Jan. 16, 1962

3,017,411
NEW SUBSTITUTED PHTHALAZONES AND PROCESS FOR THEIR PREPARATION
Heinz-Joachim Engelbrecht, Dessau, Dieter Lenke, Rodleben, and Hildegard Müller, Dessau, Germany, assignors to VEB Deutsches Hydrierwerk Rodleben, Rodleben, Germany
No Drawing. Filed July 23, 1958, Ser. No. 750,308
Claims priority, application Germany Aug. 15, 1957
11 Claims. (Cl. 260—247.2)

The present invention relates to certain N-substituted phthalazones and to a process for the preparation of the same. More particularly, the compounds of this invention contain basic substituents on the amine nitrogen of the phthalazone and may be represented by the general formula

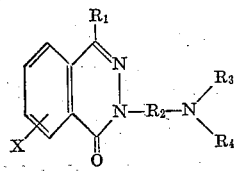

In this formula $R_1$ is an aryl or aralkyl group, which, if desired, may be substituted in the nucleus; $R_2$ is bivalent straight or branched aliphatic chain with at least 2 and at the most 5 carbon atoms; $R_3$ and $R_4$ are low molecular weight aliphatic groups, which may be closed to form a heterocyclic ring; and X is hydrogen or halogen bonded to the benzene nucleus. More particularly, $R_1$ is an aryl or aralkyl radical which may contain up to 4 rings in the nucleus preferably monocyclic or bicyclic and which may contain a variety of substituents, such as alkyl, halogen, hydroxy or alkoxy, etc.; $R_2$ is a bivalent straight or branched chain aliphatic hydrocarbon group containing from 2 to 5 carbon atoms; and $R_3$ and $R_4$ are monovalent or divalent aliphatic hydrocarbon groups, divalent ether or divalent linked aliphatic hydrocarbon radicals or divalent nitrogen linked aliphatic hydrocarbon radicals, wherein when $R_3$ and $R_4$ are divalent radicals, they are joined at their terminal ends to form a heterocyclic nucleus.

The new compounds are obtained in accordance with this invention by reacting a phthalazone of the general formula

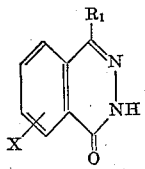

preferably in the form of its alkali metal compound with a haloalkyl amine of the general formula

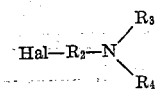

In these formulae Hal represents a halogen atom, while $R_1$, $R_2$, $R_3$ and $R_4$ have the meaning given above.

A variety of phthalozones may be used as starting materials for the present process. Among these may be mentioned: 4-phenylphthalazone, 4-m-cresylphthalazone, 4-α-naphthylphthalazone, 4-benzylphthalazone, 4-benzyl-6(7)-chlorphthalazone, 4-p-brombenzylphthalazone, 4-o-methoxybenzylphthalazone, 4-p-isopropoxybenzylphthalazone.

Various haloalkyl amines may be used for the present condensation reaction. Included among these are: dimethylaminoethylchloride, diethylaminoethylchloride, piperidinoethylchloride, pyrrolidinoethylchloride, morpholinoethylchloride, 1-dimethylamino-3-chlorpropane, 2-dimethylamino - 3 - chlorpropane, 1 - methylethylamino-3-chlorbutane.

For the purpose of carrying out the present condensation reaction, the phthalazones are advantageously dissolved in an organic solvent which is immiscible with water; for example, hydrocarbon solvents such as benzene, toluene or xylene. Thereafter, equimolecular amounts of an alkali metal or an alkali metal amide, preferably sodium amide, are added under stirring and cooling. In doing so, the alkali metal compounds of the phthalazones are formed. It is recommended that the reaction mixture be heated for some time after addition of the sodium amide, to a moderately elevated temperature, preferably between 50–80° C., until the ammonia generation ceases. Subsequently, the haloalkyl amine is added at room temperature or moderately elevated temperature. The reaction is carried to completion by heating for several hours at the boiling temperature of the solvent. It is also feasible to dissolve the phthalazone and the haloalkyl amine in the solvent and then add the sodium amide, advantageously at moderately elevated temperature, for example, 40–50° C. Also in this case, the reaction is completed by subsequent heating. It is also possible to carry out the reaction in such a manner that the phthalazone is first converted into its alkali metal salt by means of aqueous or alcoholic caustic alkalis. This alkali salt is then isolated in the ordinary manner, whereafter, suspended in the mentioned solvents, it is heated with the haloalkyl amines while stirring, so as to cause the reaction to take place.

The reaction product is worked up in the usual manner, for example, by washing the reaction liquor with diluted sodium bicarbonate solution and saturated NaCl solution. It is also possible, instead, to take up the phthalazone containing the basic substituents in diluted acid, precipitating the free base with alkali and extracting it with a solvent which is immiscible with water, for example, ether or benzene. The end product is purified either by vacuum distillation or by conversion into suitable salts. The free bases may also be quaternized in a known manner.

The phthalazones which are used as starting materials for this invention are known or are obtainable according to known processes, for example, by condensation of hydrazine with o-benzoylbenzoic acid, and m-tolyl-o-benzoic acid, benzalphthalide, p-chlorobenzalphthalide, p-methoxybenzalphthalide, naphthobenzalphthalide, etc.

The compounds which are obtained in accordance with this invention have not been described in the literature. They are valuable pharmaceutical compounds which exhibit a strong histaminolytic, spasmolytic and local-anaesthetic effect. Of particular importance is the very considerable, specific and long lasting anti-histaminic effect exhibited by these new compounds. They are very much different in their constitution from known compounds having similar effects. Consequently, they constitute a new type of highly efficient anti-histamines. They may also be used for the production of penicillin salt having a lasting effect.

The following examples are further illustrative of the present invention, and it will be understood that the invention is not limited thereto:

Example 1

A solution which consists of 23.6 parts by weight of 4-benzylphthalazone, 5.6 parts by weight of caustic potash, 200 parts by volume of water and 50 parts by volume of ethyl alcohol, is concentrated by evaporation to dryness. The residue is washed with acetone and dried at 110° C. 14.8 parts by weight of the thus obtained potassium salt of 4-benzylphthalazone are suspended in 75 parts by volume of toluene. The suspension thus obtained is gradually admixed at 90° C. with 8.2 parts by weight of β- diethylaminoethylchloride, whereafter the heating is continued for several hours under vigorous stirring and reflux cooling. After cooling, 100 parts by volume of water are added. The aqueous layer is separated from the toluene layer, and the toluene layer is shaken with water and 3% sodium bicarbonate solution. Upon drying the distilling off the toluene, 15.1 parts by weight of 2-(β-diethylaminoethyl)-4-benzylphthalozone-(1) (boiling point at 0.1 mm. Hg 208–214° C.) are obtained, whose hydrochloride melts at 142–143° C.

In analogous manner one obtains from the potassium salt of 4-benzylphthalazone and β-dimethylaminoethylchloride the compound 2-(β-dimethylaminoethyl)-4-benzylphthalazone-(1) (B.P. at 0.1 mm. Hg 215–222° C.), the hydrochloride of which melts at 178° C. The methiodide of the base melts at 200° C.

In an analogous manner one obtains from 24.3 parts by weight of potassium salt of 4-benzylphthalazone and 13 parts by weight of 1-dimethylamino-3-chloropropane, 20.6 parts by weight of 2-(3'-dimethylaminopropyl)-4-benzylphthalazone-(1) (B.P.$_{0.5}$ 218° C.) whose hydrochloride melts at 173–174° C.

*Example 2*

22.2 parts by weight of 4-phenylphthalazone were suspended in 300 parts by volume of toluene. 10 parts by weight of finely powdered sodamide under toluene was added while stirring the mixture. The mixture was heated then to a temperature of 90° C. and until the evolution of ammonia ceased. In the course of a half an hour one then adds, dropwise, 15 parts by weight of β-diethylaminoethylchloride, and boils several additional hours under reflux. After cooling, and the application of suction, the solution is washed 2 times with a saturated NaCl solution and dried over sodium sulfate. After distillation 18.6 parts by weight of 2-(β-diethylaminoethyl)-4-phenyl-phthalazone-(1) are obtained (B.P.$_{0.5}$ 225–230° C.), whose hydrochloride melts at 198° C.

In an analogous manner, from 30.4 parts by weight of 4-p-chlorobenzylphthalazone, F. 218° C. (prepared by the reaction of p-chlor-phenylacetic acid and phthalic anhydride in the presence of sodium acetate and the subsequent condensation of the resulting p-chlorobenzalphthalide (F. 150°) with hydrazine) and 16.7 parts by weight of β-dimethylaminoethylchloride, 26.3 parts by weight of 2-(β-dimethylaminoethyl)-4-p-chlorobenzyl-phthalazone-(1) is obtained (B.P.$_{0.2}$ 215–220° C.) whose hydrochloride melts at 248° C.

In the same manner, from 4-p-propoxybenzylphthalazone-(1), F. 190° C., (prepared by the reaction of p-propoxyphenylacetic acid with phthalic anhydride in the presence of sodium acetate and finally the condensation of the resulting p-propoxy-benzalphthalide, F. 99–100° C., with hydrazine) and β-dimethylaminoethylchloride, the 2-(β-dimethylaminoethyl-4-p-propoxy-benzyl-phthalazone-(1) is obtained, whose hydrochloride melts at 142° C.

*Example 3*

26.6 parts by weight of 4-p-methoxybenzylphthalazone, F. 196° C. (prepared by the reaction of p-methoxyphenylacetic acid with phthalic anhydride in the presence of sodium acetate and finally the condensation of the resulting methoxybenzalphthalide, F. 148° C., with hydrazine), 400 parts by volume of toluene and 20 parts by weight of β-dimethylaminoethylchloride hydrochloride were added to 13 parts by weight of powdered sodamide at a temperature of 40–50° C., and while stirring. This was then boiled under reflux for several hours. After completion of the reaction, the reaction mixture was cooled and water was added to it. The water layer was separated from the toluene layer and the latter was shaken with dilute HCl. From the toluene unreacted starting material was recovered after drying and distillation of the solvent. The HCl solution was treated with caustic soda and the base which separated was taken up in ether. After drying and distillation of the ether, there is obtained 23 parts by weight of 2-(β-dimethylaminoethyl)-4-p-methoxybenzyl-phthalazone-(1) (B.P.$_{0.2}$ 220–223° C.), whose hydrochloride melts at 202–203° C.

In an analogous manner, from 4-isopropoxybenzylphthalazone and β-morpholinoethylchloride the 2-(β-morpholinoethyl)-4-isoproxybenzylphthalazone-(1) is obtained, whose hydrochloride melts at 100–101° C.

Analogously there is obtained from 49.5 parts by weight of 4-benzyl-6(7)-chlorphthalazone, F. 163° C., (prepared by the reaction of phenylacetic acid with 4-chlorphthalic anhydride and finally the condensation of the resulting benzal-chlorphthalide, F. 156–157° C., with hydrazine) and 21 parts by weight of β-dimethylaminoethylchloride, 29.7 parts by weight of 2-(β-dimethylaminoethyl)-4-benzyl-chlorphthalazone-(1) B.P.$_{0.5}$ 230–240° C.), whose hydrochloride melts at 203–204° C.

While the invention has been described with particular reference to specific embodiments, it is to be understood that it is not limited thereto, but is to be construed broadly and restricted solely by the scope of the appended claims.

What is claimed is:

1. 2-(β-diethylaminoethyl)-4-benzylphthalazone-(1).
2. 2-(β-dimethylaminoethyl)-4-benzylphthalazone-(1).
3. 2-(3' - dimethylaminopropyl)-4-benzylphthalazone-(1).
4. 2-(β-diethylaminoethyl)-4-phenylphthalazone-(1).
5. 2-(β - dimethylaminoethyl) - 4 - p - propoxy-benzylphthalazone-(1).
6. 2-(β-dimethylaminoethyl) - 4 - p - methoxybenzyl-phthalazone-(1).
7. 2-(β-morpholinoethyl) - 4 - isoproxybenzylphthalazone-(1).
8. As a composition of matter an N-substituted phthalazone of formula

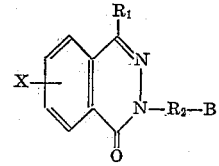

wherein $R_1$ is selected from the group consisting of phenyl, m-cresyl, α-naphthyl, benzyl, p-chlorobenzyl, p-brombenzyl, o-methoxybenzyl and p-isopropoxybenzyl; X is selected from the group consisting of hydrogen and chlorine; $R_2$ is the bivalent alkylene radical of from 2 to 5 carbon atoms; and B is selected from the group consisting of lower dialkylamino, piperidino, pyrrolidyl and morpholino.

9. As a composition of matter the hydrochloride salts of compounds of claim 8.
10. As a composition of matter the methiodide salt of 2-(β-dimethylaminoethyl)-4-benzyl-phthalazone-(1).
11. 2-(β-dimethylaminoethyl)-4-p-chlorobenzylphthalazone-(1).

References Cited in the file of this patent

UNITED STATES PATENTS 2,837,522    Bach et al. _____ June 3, 1958

FOREIGN PATENTS 490,069    Belgium _____ Nov. 1, 1949

OTHER REFERENCES

Marly: Chemical Abstracts, vol. 51 (1957), column 1305.

Simpson: Chemistry of Heterocyclic Compounds, Condensed Pyridazine and Pyrazine Rings (Interscience, 1953), pages 82–3.

Fieser: Organic Chemistry (third edition), 1956, pages 228–9.

Hellman et al.: Chemische Berichte, vol. 89 (1956), page 598.